United States Patent [19]

Bigall

[11] Patent Number: 5,373,757
[45] Date of Patent: Dec. 20, 1994

[54] ADJUSTABLE HANDLEBAR MOUNTING
[75] Inventor: Wade Bigall, Rolling Meadows, Ill.
[73] Assignee: Profile For Speed, Inc., Chicago, Ill.
[21] Appl. No.: 79,770
[22] Filed: Jun. 22, 1993
[51] Int. Cl.[5] .................. B21K 21/16; B21K 21/12
[52] U.S. Cl. .................. 74/551.3; 74/551.1; 280/279
[58] Field of Search ............ 74/551.1-551.8; 280/279

[56] References Cited

U.S. PATENT DOCUMENTS

| 660,875 | 10/1900 | Wambach | 280/279 |
| 4,322,087 | 3/1982 | Addicks | 280/279 |
| 4,323,263 | 4/1982 | Cook et al. | 280/279 |
| 4,337,962 | 7/1982 | Allen et al. | 74/551.1 |
| 4,783,187 | 11/1988 | McMurtrey | 74/551.1 X |
| 4,903,627 | 2/1990 | Nakamura | 74/551.3 X |
| 4,911,458 | 3/1990 | Lin et al. | 74/551.3 |
| 5,269,550 | 12/1993 | Hon et al. | 280/279 X |

FOREIGN PATENT DOCUMENTS

| 0497429 | 8/1992 | European Pat. Off. | 74/551.3 |
| 1048173 | 12/1958 | Germany | 74/551.3 |
| 5-16859 | 1/1993 | Japan | 280/279 |
| 228411 | 2/1925 | United Kingdom | 74/551.3 |
| 625048 | 6/1949 | United Kingdom | 280/279 |
| 603604 | 4/1978 | U.S.S.R. | 280/279 |

Primary Examiner—Vinh T. Luong
Attorney, Agent, or Firm—Dorn, McEachran, Jambor & Keating

[57] ABSTRACT

An adjustable handlebar mounting assembly adapted to mount above the head tube of a bicycle frame includes a pair of inserts, each of which has a generally cylindrical inner surface formed and adapted to at least in part encircle the bicycle steerer tube. Each of the inserts has a generally arcuate exterior surface, the axis of which is generally perpendicular to the axis of the generally cylindrical interior surfaces. There is a front cap and a back cap, each of which has an interior surface which mates with the exterior surface of an insert. Fasteners secure the caps together and in tight engagement with the exterior of the inserts. A stem extension tube is attached to the front cap and a handlebar is mounted to the stem extension tube. The mating surfaces of the inserts and caps are adjustable in their relative positions, whereby the position of the caps relative to the inserts and the bicycle frame, and thus the angle of the stem extension relative to the frame, is adjustable.

9 Claims, 2 Drawing Sheets

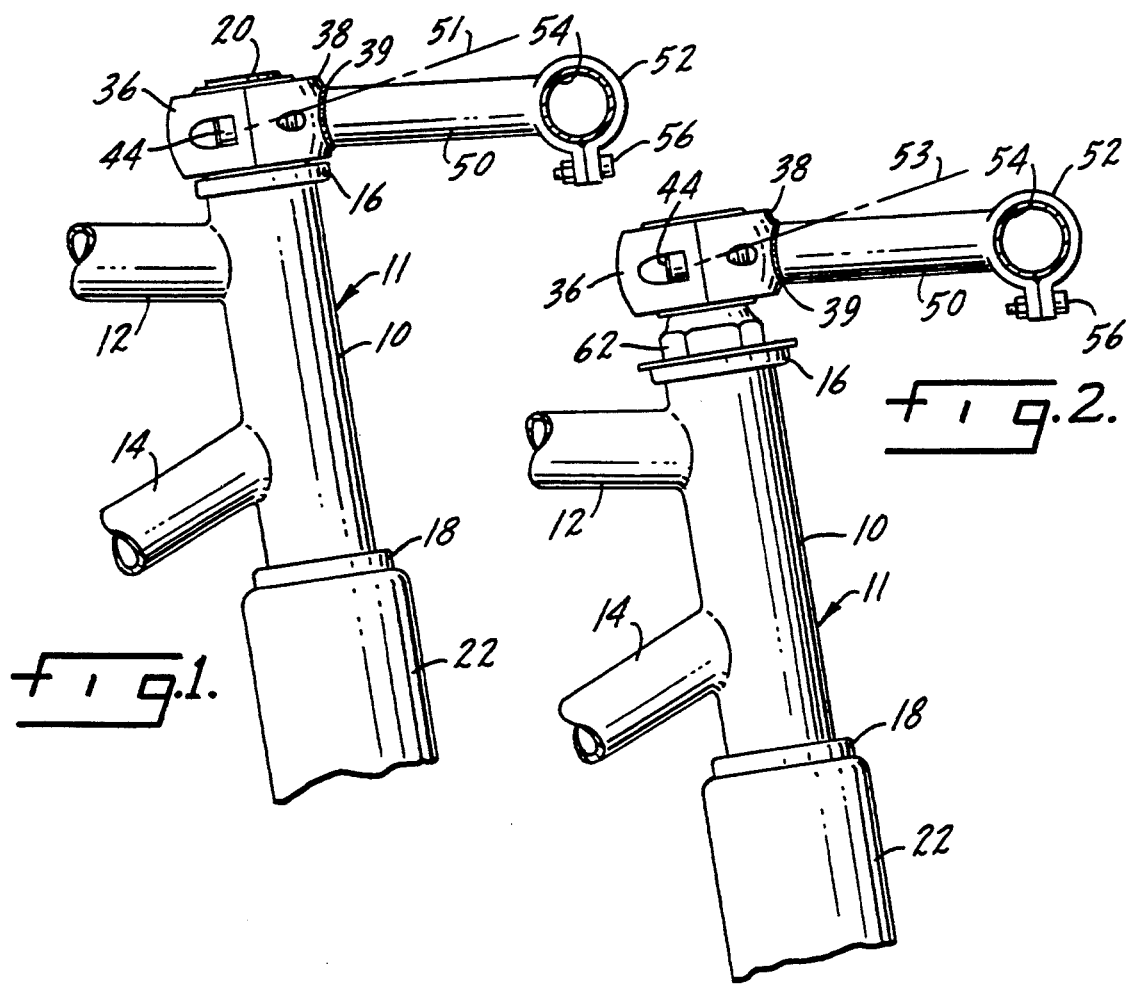
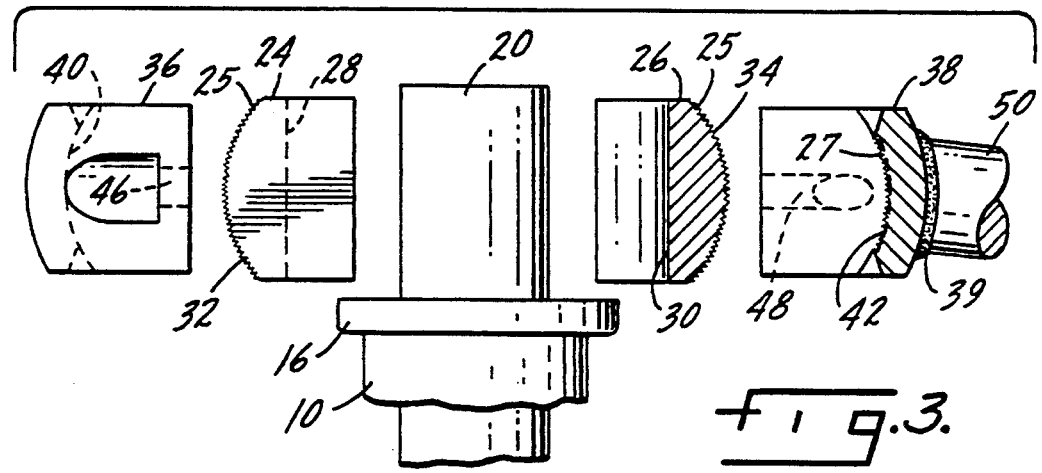

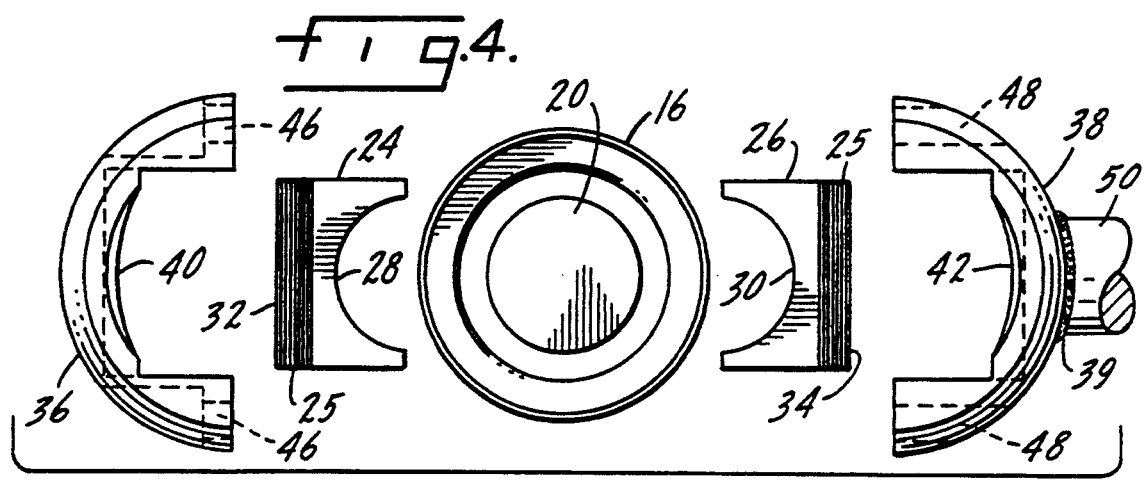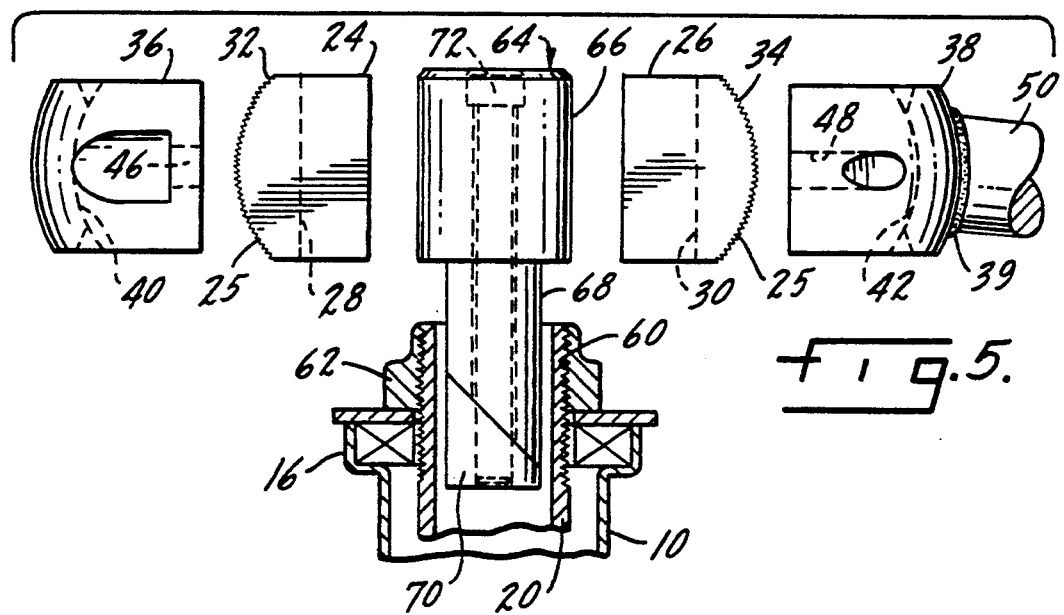

ADJUSTABLE HANDLEBAR MOUNTING

THE FIELD OF THE INVENTION

The present invention relates to adjustable handlebars for bicycles and in particular to an adjustment which permits the angle of the handlebar relative to the end of the steerer tube to be adjustable which is commonly referred to in the bicycle art as the "rise" of the handlebar. The invention provides not only for adjustment of the rise of the handlebar, but also for mounting the adjustable handlebar on steerer tubes with or without threaded ends and on steerer tubes of varying exterior diameter.

SUMMARY OF THE INVENTION

The present invention relates to an adjustable handlebar assembly for adjusting the relative angle of the handlebar to the frame of the bicycle.

A primary purpose of the invention is a simply constructed and reliable adjustable handlebar assembly which permits ready and quick adjustment of the rise of the handlebar.

Another purpose is an adjustable handlebar assembly suitable for use with steerer tubes of varying external diameter.

Another purpose is an adjustable handlebar assembly of the type described usable both with threaded and unthreaded steerer tubes.

Other purposes will appear in the ensuing specification, drawings and claims.

BRIEF DESCRIPTION OF THE DRAWINGS

The invention is illustrate diagrammatically in the following drawings wherein:

FIG. 1 is a side elevation of one embodiment of the invention illustrating the adjustable handlebar mounted to the frame of a bicycle;

FIG. 2 is a side elevation, similar to FIG. 1, illustrating a second embodiment of the invention;

FIG. 3 is an enlarged exploded view illustrating the adjustable connection between the stem extension and the bicycle frame of the FIG. 1 embodiment;

FIG. 4 is an enlarged exploded top view of the adjustable connection illustrated in FIG. 3; and FIG. 5 is an enlarged exploded side view illustrating the adjustable connection of the embodiment of FIG. 2.

DESCRIPTION OF THE PREFERRED EMBODIMENT

In the embodiment of FIG. 1, the head tube of the bicycle is indicated at 10 and, as is conventional, forms a portion of the frame 11, there being a top bar 12 and a lower bar 14 for the frame. The head tube has head sets indicated at 16 and 18. Inside of the head tube 10 is a steerer tube, the upper end of which is indicated at 20 in FIG. 3. The steerer tube is attached to the fork for turning the bicycle front wheel, with a portion of the fork being shown at 22 in FIG. 1. The steerer tube, as its name implies, when rotated within the head tube will turn the fork, thus turning the front wheel of the bicycle.

The embodiment of FIGS. 1, 3 and 4 illustrates the invention with a threadless steerer tube. A pair of inserts are indicated at 24 and 26, each of which has generally cylindrical inner surfaces 28 and 30, respectively, which are of a size and shape to tightly encircle and be in circumferential contact with the exterior of the steerer tube 20. It should be understood that the interior diameter of the cylindrical portion of the inserts 24 and 26 may vary, depending upon the diameter of the steerer tube. Each of inserts 24 and 26 has arcuate exterior surfaces 32 and 34, respectively, which may be serrated, roughened, formed with parallel grooves 25, 27, respectively, or otherwise constructed to have a non-slipping characteristic. The axis of the arcuate exterior surfaces is generally perpendicular to the axis of the interior cylindrical surfaces.

Extending about the exterior of the inserts 24 and 26 is a rear cap 36 and a front cap 38. Each of the front and rear caps has arcuate interior surfaces indicated at 40 and 42, respectively, which have formed thereon serrations, grooves, or an otherwise roughened surface such that when the caps are attached to the exterior of the inserts, by threaded fasteners 44, no relative movement between the caps and the inserts is permitted. There is a threaded fastener 44 on each side of the joined caps, with the fasteners extending through a bore 46 in the rear cap and a threaded bore 48 in the front cap. Thus, the fasteners join the two caps together and secure the caps to the exterior of the inserts, thus mounting the entire assembly upon the steerer tube of the bicycle.

Front cap 38 may have welded thereto, as at 39 a stem extension tube 50 which terminates in a generally cylindrical handlebar mounting collar 52. The handlebar will extend through the bore 54 of collar 52, there being a fastener 56 to close the gap between portions of the handlebar mounting collar 52 so as to firmly fix the handlebar relative to the extension tube.

In order to adjust the rise of the handlebar which is the angle the extension tube 50 makes with the head tube and the steerer tube, fasteners 44 may be loosened so that the relative position of the front and back caps on the inserts 24 and 26 is adjustable. The caps are moved in unison, once the fasteners are loose, to a desired adjustment position and once the fasteners are again tightened, the interlocking or mating serrations or grooved surfaces of the inserts and the caps securely hold the stem extension tube in the adjusted position. The adjusted position is indicated in FIG. 1 by broken line 51.

FIGS. 2 and 5 illustrate the adjustable handlebar assembly as applied to a threaded steerer tube. Like parts have been given the same numbers. In this embodiment the steerer tube is exteriorly threaded, as indicated at 60 in FIG. 5, and a nut 62 is mounted thereon to secure the steerer tube above the head set and to the top of the head tube. A quill 64 has an exterior cylindrical area 66 and an interior cylindrical area 68 of reduced diameter which extends inside of the threaded steerer tube. The quill 64 has an expansion wedge 70 movable by a threaded fastener 72 extending through the length of the quill and accessible from the top of the quill. The quill is inserted within the steerer tube as illustrated in FIG. 5 and the fastener 72 is turned until the expansion wedge securely mounts the quill to the steerer tube. Once the quill has been so mounted, the inserts 24 and 26 and the back and front caps 36 and 38 may be mounted to the exterior of the quill in the same manner as in the FIG. 1 embodiment. The adjusted position is indicated in FIG. 2 by broken line 53.

Of particular importance in the invention is the ability to adjust the rise of the bicycle handlebar with a number of simply constructed, reliable parts. Not only does the invention provide for adjustment of the rise, but it provides for utility of the adjustable handlebar assembly on both threaded and threadless steerer tubes. Further, the invention provides for inserts of varying internal diameter to accommodate steerer tubes of varying exterior diameter.

Whereas the preferred form of the invention has been shown and described herein, it should be realized that there may be many modifications, substitutions and alterations thereto.

The embodiments of the invention in which an exclusive property or privilege is claimed are defined as follows:

1. An adjustable handlebar mounting assembly mounted on a bicycle frame head tube including a pair of inserts, each of which has a generally arcuate inner surface formed and adapted to at least in part encompass a cylindrical surface of a portion of a bicycle extending above the frame head tube, each of said inserts having a generally arcuate exterior surface, the axis of which is generally perpendicular to the axis of the generally arcuate interior surfaces, a front cap and a back cap, each of which has an interior surface which mates with the exterior surface of an insert, means for securing said caps together and in tight engagement with the exterior of said inserts, a stem extension tube attached to said front cap and adapted to mount a handlebar the mating surfaces of the inserts and caps having adjustable interlocking means thereon whereby the position of the caps relative to the inserts and thus the angle of the stem extension tube relative to said portion of a bicycle extending above the head tube, is adjustable.

2. The adjustable handlebar mounting assembly of claim 1 further characterized in that the exterior surfaces of the inserts and the interior surfaces of the front cap and the back cap have a series of generally parallel grooves formed and adapted to mesh together to secure the caps on the inserts.

3. The adjustable handlebar mounting assembly of claim 1 further characterized in that said stem extension tube is welded to said front cap.

4. The adjustable handlebar mounting assembly of claim 1 further characterized in that said front cap and said back cap are attached together by threaded fasteners located on opposite sides of said caps.

5. The adjustable handlebar mounting assembly of claim 1 further characterized in that said inserts are formed and adapted to at least in part encompass a steerer tube extending upwardly from the frame head tube.

6. The adjustable handlebar mounting assembly of claim 1 further characterized by and including a removable quill formed and adapted to extend within a steerer tube located within the head tube, said inserts being formed and adapted to at least in part encompass the exterior of said removable quill.

7. The adjustable handlebar assembly of claim 6 further characterized in that said removable quill has a cylindrical portion which extends outwardly from the steerer tube, and an expandable portion which is located within the steerer tube to attach the quill to the steerer tube.

8. An adjustable handlebar mounting assembly mounted on a bicycle frame steerer tube including a pair of inserts, each of which has a generally arcuate inner surface formed and adapted to at least in part encompass a cylindrical surface of the steerer tube, each of said inserts having a generally arcuate exterior surface, the axis of which is generally perpendicular to the axis of the generally arcuate interior surfaces, a front cap and a back cap, each of which has an interior surface which mates with the exterior arcuate surfaces of an insert, means for securing said caps together and in tight engagement with the exterior of said inserts, a stem extension tube attached to said front cap and adapted to mount a handlebar, the mating surfaces of the inserts and caps having adjustable interlocking means thereon whereby the position of the caps relative to the inserts and steerer tube, and thus the angle of the stem extension tube relative to the steerer tube is adjustable.

9. The adjustable handlebar mounting assembly of claim 1 further characterized by and including an adjustable quill which extends within the steerer tube, with said inserts in part encircling said removable quill.

* * * * *